United States Patent Office 3,714,966
Patented Feb. 6, 1973

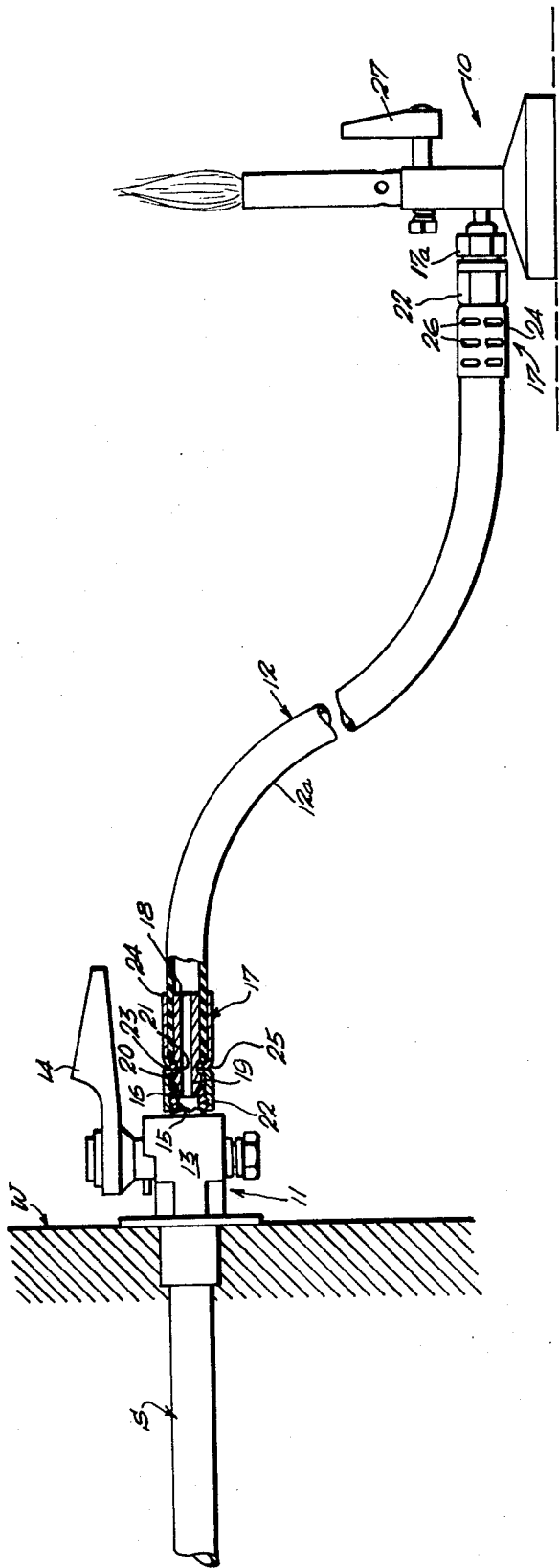

3,714,966
FLEXIBLE HIGH PRESSURE GAS LINE CONNECTOR FOR BUNSEN BURNERS AND THE LIKE
Melvyn N. Zobler and Joy Zobler, both of 1829 NE. 185th St., North Miami Beach, Fla.
Filed Feb. 1, 1971, Ser. No. 111,243
Int. Cl. F23d 13/40; F16b 15/00
U.S. Cl. 137—560　　　　　　　　　　　　　　3 Claims

ABSTRACT OF THE DISCLOSURE

A flexible gas line or conduit for connection between a fixed gas supply line and a movable gas burning appliance such as a Bunsen burner or hand torch, and which is capable of withstanding high internal pressures without leakage, is described. Both the gas service cut-off valve outlet nipple of the fixed installation and the gas feed nipple of the appliance are externally threaded to receive, removably screw-fitted thereon, connector fittings provided at each end of a high pressure flexible hose.

---

This invention relates to flexible gas feed conduits and is directed particularly to an improved flexible gas feed conduit or connector hose for supplying gas under pressure to a movable Bunsen burner, gas torch or similar movable gas-burning appliance.

Heretofore, in scientific laboratories, dental laboratories and the like where movable Bunsen burners and/or gas torches of one kind or another are used for heating purposes, it has been common practice to make the gas feed connection between such burners and the usual rigid service or supply outlet by use of a length of rubber tubing or hose slip-fitted at one end to an outlet nipple at the gas supply and also slip-fitted at the other end to a gas appliance feed nipple forming part of the Bunsen burner or torch. In such installations, the rigid pipe gas service installation terminates in a gas supply cock or turn-off valve, which valve comprises the slip-fit outlet nipple for the slip-on connection of the flexible burner hose or tube. While it is preferred practice to use the permanently installed gas supply valve to control the feed to, and hence the operation of, a connected Bunsen burner or hand torch, the burners and torches are usually provided with their own gas flow control or shut-off valves allowing for flame intensity adjustment, and these Bunsen burner and torch valves are not infrequently used as independent gas supply turn-offs when heating operations are completed. In such instances, with the main gas supply valve being in "open" or "on" position, full gas supply pressure will be imposed upon the full length of the flexible connector tube or hose. Since gas supply systems in such installations are regulated to maintain a comparatively low gas pressure, in the order of one-half pound per square inch, there is little danger of gas leakage or blow-off of such slip-fit rubber or rubber-like gas feed connector devices. However, if full service gas pressure should inadvertently be applied to the branch conduit feeding such a flexible gas interconnection, due to malfunction or improper installation of a gas pressure regulator, for example, such pressure, usually being in the range of from 180 to 300 pounds per square inch, could very easily result in leakage or even blow-off at the slip-fit tubing end connections. If such leakage happened to be undetected for any appreciable length of time, explosive proportions of escaped gas and surrounding air might readily result, to be ignited by any subsequent open flame such as the striking of a match or a spark created by electrical switching or the automatic operation of electrical equipment.

It is, accordingly, the principal object of this invention to provide a flexible high pressure gas line connector for Bunsen burners and the like which will withstand extraordinarily high internal pressures, such as might accidentally be imposed by improper or non-operation of line pressure regulator equipment, and thereby obviate the hazard of explosion under conditions as described above.

It is a more particular object of this invention to provide a flexible gas appliance connector of the character above described wherein externally-threaded nipples are utilized at both the gas supply outlet at the fixed service supply valve and the gas appliance inlet of the burner or torch, to be disconnectably joined by co-operative screw-on coupler members securely affixed at each end of a length of high pressure flexible hose.

Yet another object of the invention is to provide a flexible connector mechanism for movable Bunsen burners, gas torches and the like which will be simple in construction, inexpensive to manufacture, dependable in performance and durable in use.

Other objects, features and advantages of the invention will be apparent from the following description when read with reference to the accompanying drawing, the single figure of which illustrates, in elevation and partly in section, a preferred form of flexible high pressure gas line connector embodying the invention.

Referring now in detail to the drawing, reference numeral 10 designates, by way of example, a Bunsen burner disconnectably connected to a fixed gas supply shut-off valve 11 by means of a flexible gas line connector assembly 12 comprising the invention. The gas supply shut-off valve 11, which, by way of illustration, is shown installed in an interior side wall W, is screw-threaded, soldered or otherwise connected with a gas service line or branch line S feeding gas under pressure. The gas shut-off valve 11 comprises a valve body portion 13 fitted with a rotary flow control mechanism of known construction, manually controlled by flow control handle 14. The gas outlet port of the gas supply shut-off valve 11 comprises an externally-threaded nipple portion 15 extending outwardly of the valve body portion 13 and having an interiorly chamfered nipple end providing a frustoconical seat 16.

The line connector assembly 12 comprises a length of tubing 12a, preferably of reinforced natural or synthetic rubber, at each end of which is secured a screw-on coupling member 17. The screw-on coupling members 17 each comprise a tubular metal plug member 18 friction-fitted within its respective end of the length of tubing 12a, said metal plug members being integrally formed with a centrally-apertured head portion 19. Each plug member head portion 19 is externally peripherally beveled at its outer end to provide a frusto-conical surface 20 seatable in close-fitting, face-to-face engagement with the chamfered seat portion 16 of the valve body nipple portion 15. Each screw-on coupling member 17 further comprises a tubular, internally-threaded cap member 22, the inner end of which is fitted over the outer periphery of the plug member head portion 19 to be retained thereat by an inwardly-turned collar portion 23 thereof received within the annular recess 21 behind said head portion. An elongated ferrule 24 embracingly disposed in circumjacent relation with respect to an outer end portion of the tubing 12a and substantially co-extensive with the interior tubular metal plug member 18 has its outer end portion 25 crimped or otherwise pressed down into the annular recess 21 in said plug member to retain and affix said plug member in place within its tubing end. In order to more securely affix the elongated ferrules 24 in place with respect to their outer end portions of the connector tubing 12a, the outer peripheries thereof are formed with crimps or depressions 26, as is illustrated in the coupling member 17 connected with fitting 17a of the Bunsen burner 10. In this conection, it is to be noted that the supply fitting 17a feeding the Bunsen burner 10 is integrally formed with an externally-threaded nipple portion (not illustrated) identical or substantially identical with the nipple portion 15 comprising the gas supply shut-off valve 11.

In operation, it will be understood that when the internally-threaded cap members 22 of the screw-on coupling members 17 are tightly screw-threaded on their respective externally-threaded nipples forming part of the gas supply shut-off valve 11 and the utilization appliance or bunsen burner 10, the frusto-conical surfaces of 20 of the coupling member head portions 19 will be brought into sealing engagement with respect to the chamfered seat portions 16 of the valve body nipple portion 15 and the appliance connector fitting 17a to provide for leak-proof gas feed to the appliance. The secure retention of the ends of the connector tubing 12a on their respective tubular metal plug members 18, as described above, minimizes the possibility of leakage or blow-out at the tubing ends even at pressures greatly in excess of those normally used in gas supply service lines, whether or not pressure regulated at the customer's branch supply. The invention thus makes it possible to turn off as well as to adjust the gas supply at the appliance, such as by use of the bunsen burner gas flow control valve 27, without danger of gas leakage due to failure of the flexible gas appliance connector.

While we have illustrated and described herein only one form in which our invention can conveniently be embodied in practice, it is to be understood that this form is given by way of example only and not in a limiting sense. The invention, in brief, comprises all the embodiments and modifications coming within the scope and spirit of the following claims.

What we claim as new and desire to secure by Letters Patent is:

1. A flexible high pressure gas line connector for bunsen burners, torches and the like gas burning appliances comprising, in combination, a source of gas supply having a gas outlet port, a gas burning appliance having a gas inlet port, said inlet and outlet ports each comprising an externally-threaded nipple, a length of flexible tubing, and a pair of coupling members affixed one each to the ends of said length of tubing, said coupling members each comprising a tubular metal plug member embracingly fitted within and extending outwardly of an end portion of said length of tubing, an internally-threaded, annular cap member circumjacent the outwardly-extending end of said plug member and extending outwardly thereof, and means for constraining said cap member to mutual rotative motion with respect to said plug member, said cap members being cooperatively threadable on one each of said externally-threaded nipples for interconnecting said source of gas supply with said gas burning appliance, said coupling members each further comprising an elongated ferrule circumjacent said outer end portion of said length of flexible tubing, means for securing said ferrule in place with respect to said length of flexible tubing, and an annular recess in the outer periphery of said metal plug member, the outer end of said ferrule extending beyond the outer end of its respective tubing end portion and being turned inwardly into inter-fitting engagement with respect to said annular recess, said cap member constraining means comprising an inwardly-turned collar portion at the inner end of said cap member and rotatively slidingly received within said annular recess.

2. A flexible high pressure gas line connector as defined in claim 1, said externally-threaded nipples being internally chamferred at their outer ends, and said plug members being beveled at their outer ends to provide frusto-conical surfaces seatable, one each, in close-fitting, face-to-face engagement within said chamferred ends of said nipples.

3. A flexible high pressure gas line connector for bunsen burners, torches and the like gas burning appliances comprising, in combination, a source of gas supply having a gas outlet port, a gas burning appliance having an inlet port, said inlet and outlet ports each comprising an externally-threaded nipple, a length of flexible tubing, and a pair of coupling members affixed one each to the ends of said length of tubing, said coupling members each comprising a tubular metal plug member embracingly fitted within and extending outwardly of an end portion of said length of tubing, an internally-threaded, annular cap member circumjacent the outwardly-extending end of said plug member and extending outwardly thereof, means for constraining said cap member to mutual rotative motion with respect to said plug member, said cap members being cooperatively threadable on one each of said externally-threaded nipples for interconnecting said source of gas supply with said gas burning appliances, said externally-threaded nipples being internally chamferred at their outer ends, and said plug members being beveled at their outer ends to provide frusto-conical surfaces seatable, one each, in close-fitting, face-to-face engagement within said chamferred ends of said nipples.

References Cited

UNITED STATES PATENTS

| 786,507 | 2/1904 | Mann | 285—251 |
|---|---|---|---|
| 2,029,846 | 2/1936 | Von Henke | 285—251 |
| 2,809,056 | 10/1957 | Kaiser | 285—251 X |
| 1,865,033 | 6/1932 | Mott et al. | 431—029 DIG |

WILLIAM R. CLINE, Primary Examiner

U.S. Cl. X.R.

285—251; 431—355